United States Patent
Ogata

(10) Patent No.: US 6,866,293 B2
(45) Date of Patent: Mar. 15, 2005

(54) HEAD PROTECTING AIRBAG DEVICE

(75) Inventor: Tetsuya Ogata, Aichi-ken (JP)

(73) Assignee: Toyoda Gosei., Co. Ltd., Aichi-ken (JP)

( * ) Notice: Subject to any disclaimer, the term of this patent is extended or adjusted under 35 U.S.C. 154(b) by 175 days.

(21) Appl. No.: 10/388,418

(22) Filed: Mar. 17, 2003

(65) Prior Publication Data

US 2003/0178824 A1 Sep. 25, 2003

(30) Foreign Application Priority Data

Mar. 20, 2002 (JP) ........................................ 2002-077813

(51) Int. Cl.⁷ .......................... B60R 21/16; B60R 21/22
(52) U.S. Cl. .................................. 280/730.2; 280/743.2
(58) Field of Search ............................ 280/743.2, 730.2

(56) References Cited

U.S. PATENT DOCUMENTS

| | | | | |
|---|---|---|---|---|
| 5,462,308 A | * | 10/1995 | Seki et al. ................... | 280/749 |
| 5,752,713 A | * | 5/1998 | Matsuura et al. ......... | 280/730.2 |
| 6,273,458 B1 | * | 8/2001 | Steffens et al. ........... | 280/730.2 |
| 6,340,172 B1 | * | 1/2002 | Ohlert et al. ............. | 280/730.2 |
| 6,375,216 B1 | * | 4/2002 | Eschbach .................. | 280/730.1 |
| 6,454,296 B1 | * | 9/2002 | Tesch et al. .............. | 280/730.2 |
| 6,733,035 B2 | * | 5/2004 | Thomas et al. ........... | 280/730.2 |
| 2002/0074777 A1 | * | 6/2002 | Osentoski et al. ........ | 280/730.2 |

FOREIGN PATENT DOCUMENTS

JP         H9-249089         9/1997

* cited by examiner

*Primary Examiner*—Ruth Ilan
(74) *Attorney, Agent, or Firm*—Posz & Bethards, PLC

(57) ABSTRACT

A head protecting airbag device of the invention is provided with an airbag which expands to cover the vehicular interior sides of a window and a pillar garnish. Near the front or rear edge of an inner panel, a guide member is so arranged in the vertical direction that its vehicular interior side is covered by the edge portion of the pillar garnish. A flexible connection member, which is slidably connected to the guide member, is connected to a portion of the airbag toward the center of the window. Moreover, the connection member pushes open the edge portion of the pillar garnish toward the vehicular interior side as the connection member slides downward along the guide member when the airbag expands.

7 Claims, 8 Drawing Sheets

HEAD PROTECTING AIRBAG DEVICE

This application claims priority from Japanese patent application of Ogata, filed Mar. 20, 2002, No.2002-77813, the complete disclosure of which is hereby incorporated into the present application by this reference.

BACKGROUND OF THE INVENTION

1. Field of the Invention

The present invention relates to a head protecting airbag device provided with an airbag which is folded and housed on the upper edge of a window on the interior side of a vehicle so that it can expand and inflate downward from the upper edge of the window when it admits inflating gas, to cover the vehicular interior side of the window. More particularly, the invention relates to a head protecting airbag device which is constructed so that the airbag is guided by a guide member as it expands and inflates.

2. Description of the Related Art

In the related art, there is a head protecting airbag device, which has a construction disclosed in JP-A-9-249089 and so on.

In this head protecting airbag device, there is arranged an airbag folded and housed on the upper edge of a window and a guide member which guides downward the rear edge of the airbag when the airbag expands and inflates. This guide member is vertically arranged so as to extend along a center pillar portion of a vehicle. This guide member connects a ring-shaped connection member, which is arranged at the rear edge of the airbag. And, this airbag device is so constructed that the airbag is inflated while being expanded downward along the guide member, by sliding the connection member downward along the guide member.

However, the head protecting airbag device having the aforementioned construction is not so constructed that the airbag expanded and inflated covers substantially the whole face of the vehicular interior side of the center pillar portion.

Even if the head protecting airbag device of the aforementioned construction is so modified that the airbag having completed its expansion and inflation covers substantially the whole face of the vehicular interior side of the center pillar portion, it would still be necessary to provide a pillar garnish on the vehicular interior side of the pillar portion to cover the guide member, with an breakaway portion or the like to be broken and opened at a line along the guide member so that the connection member can slide downward when the airbag expands and inflates. This is because the connection member to be connected to the guide member having the aforementioned construction is arranged not at the rear edge of the airbag but at an intermediate portion of the airbag.

In the head protecting airbag device thus constructed, however, in case the opening is not smoothly formed when the airbag expands and inflates, the downward movement of the connection member is obstructed, and the airbag may be unable to expand smoothly along the guide member.

SUMMARY OF THE INVENTION

An object of the present invention is to provide a head protecting airbag device, in which an airbag can expand smoothly along a guide member covered with a pillar garnish even if the airbag still covers the vehicular interior side of the pillar garnish in a pillar portion when it completes its inflation.

The object of the invention can be achieved by the head protecting airbag device having the following constructions.

According to the invention, there is provided a head protecting airbag device comprising:

an airbag folded and housed above the upper edge of a window on the interior side of a vehicle and extending over a pillar portion adjacent to the window, wherein the airbag expands and inflates downward when it admits inflating gas, thereby to cover the vehicular interior side of the window and a pillar garnish of a synthetic resin arranged on the vehicular interior side of an inner panel of the pillar portion, wherein a guide member is vertically arranged near either the front or rear edge of the inner panel so that its vehicular interior side is covered with the edge portion of the pillar garnish, wherein a flexible connection member slidably connected to the guide member is connected to the airbag, wherein the connection portion of the connection member and the airbag is arranged toward the center of the window apart from the above front or rear side of the pillar garnish, and wherein the connection member can push and open the edge portion of the pillar garnish toward the vehicular interior side as the connection member slides downward along the guide member while the airbag expands and inflates.

In the head protecting airbag device of the invention, when the airbag is expanded and inflated, the connection member pushes and opens the edge portion of the pillar garnish arranged in the vertical direction, toward the vehicular interior side while being slid downward. In the head protecting airbag device of the invention, more specifically, when the airbag is expanded and inflated, a breakaway portion of the pillar garnish at a predetermined position need not be broken. One edge of the pillar garnish is merely pushed and opened toward the vehicular interior, thereby allowing the connection member to slide downward along the guide member through the clearance between that edge portion and the inner panel. Therefore, the connection member can be smoothly slid downward. In the head protecting airbag device of the invention, moreover, the connection portion of the connection member to the airbag is arranged toward the center of the window apart from the front side or the rear side of the pillar garnish. Therefore, the airbag itself can be expanded smoothly along the guide member without interference from the edge portion of the pillar garnish so as to cover the vehicular interior side of the pillar garnish.

In the head protecting airbag device of the invention, therefore, even if the airbag covers the vehicular interior side of the pillar garnish in the pillar portion at the completion of inflation, the airbag can be smoothly expanded along the guide member covered with the pillar garnish.

Moreover, the head protecting airbag device of the invention is so constructed that the edge portion of the pillar garnish is opened toward the vehicular interior side, thereby allowing the connection member to slide downward. In order to slide the connection member, therefore, a breakaway portion or the like which is broken to form an opening need not be arranged in the pillar garnish. Alternatively, the pillar garnish may be provided on its vehicular interior side surface with a facing made of a decorative cloth or the like which would give resistance when broken. As a result, it is possible to improve the design of the vehicular interior side of the pillar garnish.

Moreover, the head protecting airbag device of the aforementioned construction is preferably constructed:

so that a regulating member is arranged over the vehicular exterior side of the pillar garnish thereby to regulate the airbag housed over the pillar garnish to protrude toward the vehicular interior side;

so that the guide member is arranged to the front side or the rear side of the regulating member; and so that the connection member is arranged on the side of the guide member apart from the regulating member.

With this construction, the airbag can be expanded and inflated smoothly without the airbag interfering with the upper end of the pillar garnish by the regulating member. In this way, even if the portion of the airbag positioned at the regulating member protrudes at the beginning of the expansion and inflation toward the vehicular interior side, moreover, the connection member is so little affected by that protrusion toward the vehicular interior side that it can slide downward along the guide member without interference with the pillar garnish upper end. This is because the connection member is arranged opposite the regulating member with regard to the guide member. As a result, the airbag itself and the connection member are kept from receiving interference from the upper end of the pillar garnish so that the airbag can be expanded more smoothly along the guide member.

Moreover, the head protecting airbag device of the aforementioned construction is preferably constructed:

so that the connection member is attached near the lower edge of the airbag; and so that the connection member is arranged so that when the airbag completes its inflation, it is at a position on the guide member which establishes a tension in the longitudinal direction of the vehicle on the lower edge side of the airbag.

With this construction, a high tension in the longitudinal direction is established on the side of the lower edge side of the airbag by the connection member. Even in case the head of a passenger pushes the airbag toward the vehicular exterior side, the airbag having an excellent cushioning property can protect the passenger head properly without being shaken greatly by the pushing force.

Moreover, the head protecting airbag device is preferably constructed such that the guide member is made of a band-shaped woven fabric.

With this construction, the guide member can be formed, for example, of the fabric material which is left after the airbag body is cut out. Therefore, it is possible to suppress the cost of manufacturing the airbag device.

Moreover, the head protecting airbag device is preferably constructed such that the guide member is fixed at its upper end to the body side of the vehicle along with the upper edge of the airbag folded and housed.

With this construction, the upper end of the guide member need not be separately fixed in the body so that the number of steps at the time of mounting the airbag device on the vehicle can be reduced.

Moreover, the head protecting airbag device is preferably constructed with the guide member formed integrally with the airbag, the upper end of the guide member connected to the upper edge side of the airbag.

With this construction, the guide member and the airbag body can be integrally formed so that the number of steps of and the cost for manufacturing the airbag can be reduced. Moreover, the upper end of the guide member need not be separately fixed in the body so that the number of steps of mounting the airbag device on the vehicle can also be reduced.

Moreover, the head protecting airbag device is preferably constructed such that the guide member is arranged near the edge of the inner panel of the pillar portion on the window side.

With this construction, when the airbag expands, the pillar garnish covering the vehicular interior side of the pillar portion opens at its window-side edge toward the vehicular interior to allow the connection member to slide downward. Moreover, the airbag is usually constructed such that the portion for covering the vehicular interior side of the window is larger than the portion for covering the vehicular interior side of the pillar garnish. Therefore, the lower edge of the airbag tends to be pulled toward the window side, creating tension. Even if the airbag is tensed toward the window while it is being expanded, however, in the aforementioned construction the connection member can slide smoothly downward along the guide member. This is because the guide member has no interference with the edge of the pillar garnish that is opened. As a result, the airbag body can be smoothly expanded and inflated.

DESCRIPTION OF THE PREFERRED EMBODIMENTS

Figure 1:
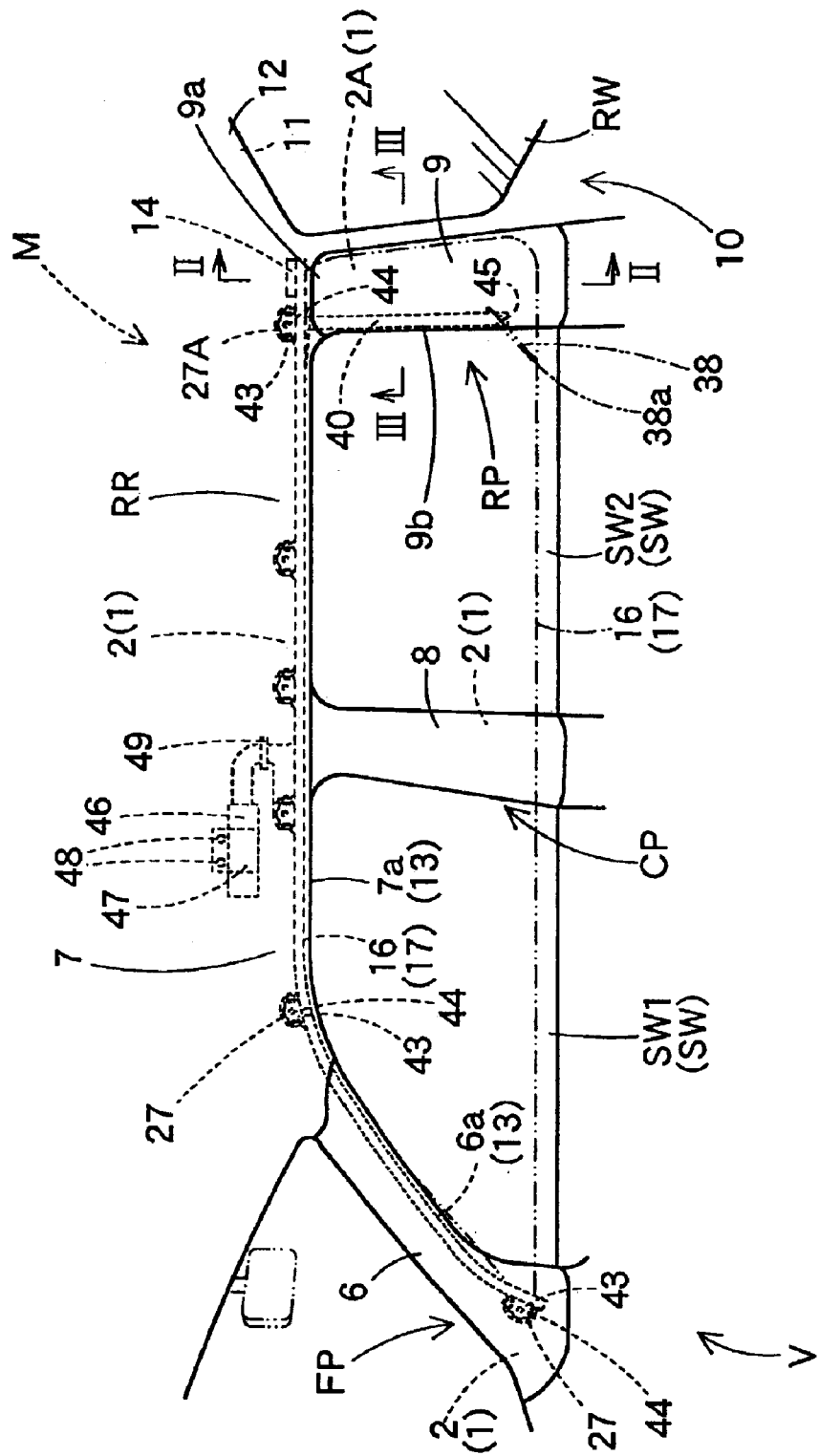
FIG. 1 is a schematic front elevation showing the activated state of a head protecting airbag device according to one embodiment of the invention and taken from the interior of a vehicle.

The invention will be described below by way of embodiments shown in the drawings. In addition, the invention is not limited to the embodiments. All modifications within the requirements of the claims and equivalents with respect to the requirements should be included in the scope of the claims.

One embodiment of the invention will be described with reference to the accompanying drawings.

A head protecting airbag device M, as shown in FIG. 1, is mounted on a double-cab vehicle V. The head protecting airbag device M is provided with an airbag 16, a guide member 40, an inflator 46 and an airbag cover 13.

Here, the double-cab vehicle V is provided with side windows SW (SW1 and SW2) positioned on the vehicular side face, and a rear wall portion 10 arranged on the rear side of the window SW2 and generally at a right angle with respect to the window SW2. The windows SW1 and SW2 are arranged sideways of the front and rear seats for passengers. The double-cabin vehicle V is further provided with a front pillar portion FP, a center pillar portion CP and a rear pillar portion RP. The front pillar portion FP is so generally arranged on the front side of the window SW1 as to extend obliquely downward from a roof side rail portion RR. The center pillar portion CP extends downward from the roof side rail portion RR between the windows SW1 and SW2. The rear pillar portion RP extends downward from the roof side rail portion RR between the window SW2 and the rear wall portion 10. Here, the window SW1 is arranged to the side of the front seat and is the window of the front door in the embodiment. On the other hand, the window SW2 is arranged to the side of the rear seat and is the window of the rear door in the embodiment.

In the individual pillar portions FP, CP and RP, respectively, pillar garnishes 6, 8 and 9 made of a synthetic resin are so arranged on the vehicular interior side as to cover sheet metal inner panels 2 and 2A within the vehicular body (body 1) on the sides facing the interior. Also, a roof head lining 7 made of a synthetic resin is arranged on the vehicular interior side so as to cover the inner panel 2 at the roof side rail portion RR.

Figure 7:
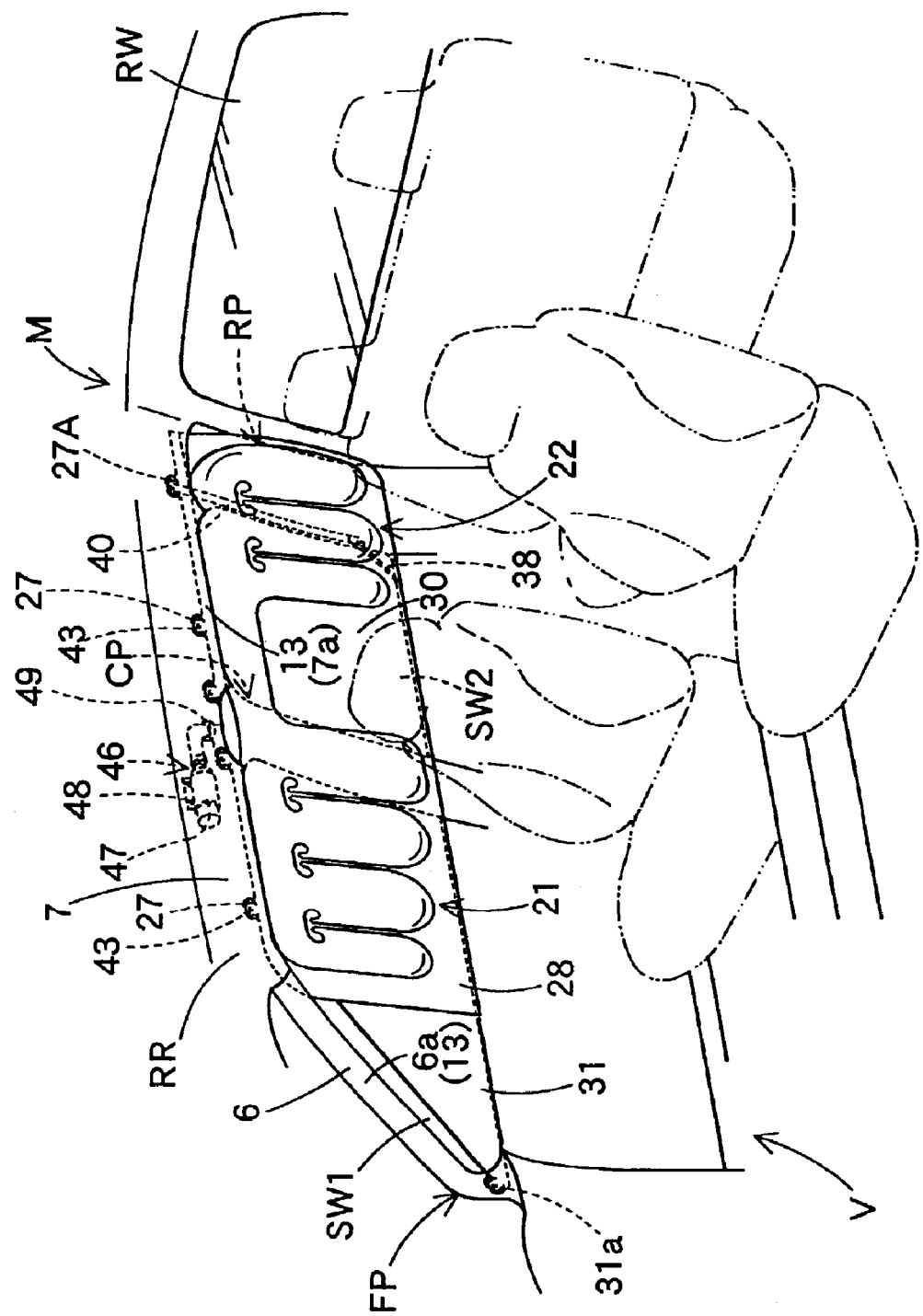
FIG. 7 is a schematic perspective view showing the state of the head protecting airbag device of the same embodiment in which the airbag is expanded.

As shown in FIGS. 1 and 7, on the other hand, a rear window RW is arranged in the upper portion of the rear wall portion 10. This rear wall portion 10 is provided with a rear panel 11 of sheet metal within the vehicular body (body 1), and a rear trim 12 of a synthetic resin for covering the vehicular interior side of the rear panel 11. Here, the upper edge of the rear wall portion 10 is covered with the roof head lining 7 extending from the ceiling.

In this embodiment, moreover, the airbag cover 13 is constructed of the lower edges 6a and 7a of the front pillar garnish 6 and the roof head lining 7. The airbag cover 13 is arranged to cover the vehicular interior side I of the airbag 16 folded and housed. Moreover, the airbag cover 13 is constructed so that it may be pushed by the airbag 16 to be opened toward the vehicular interior side I, as indicated by the double-dotted line in FIG. 2, to allow the airbag 16 to expand toward the vehicular interior side I.

Figure 2:
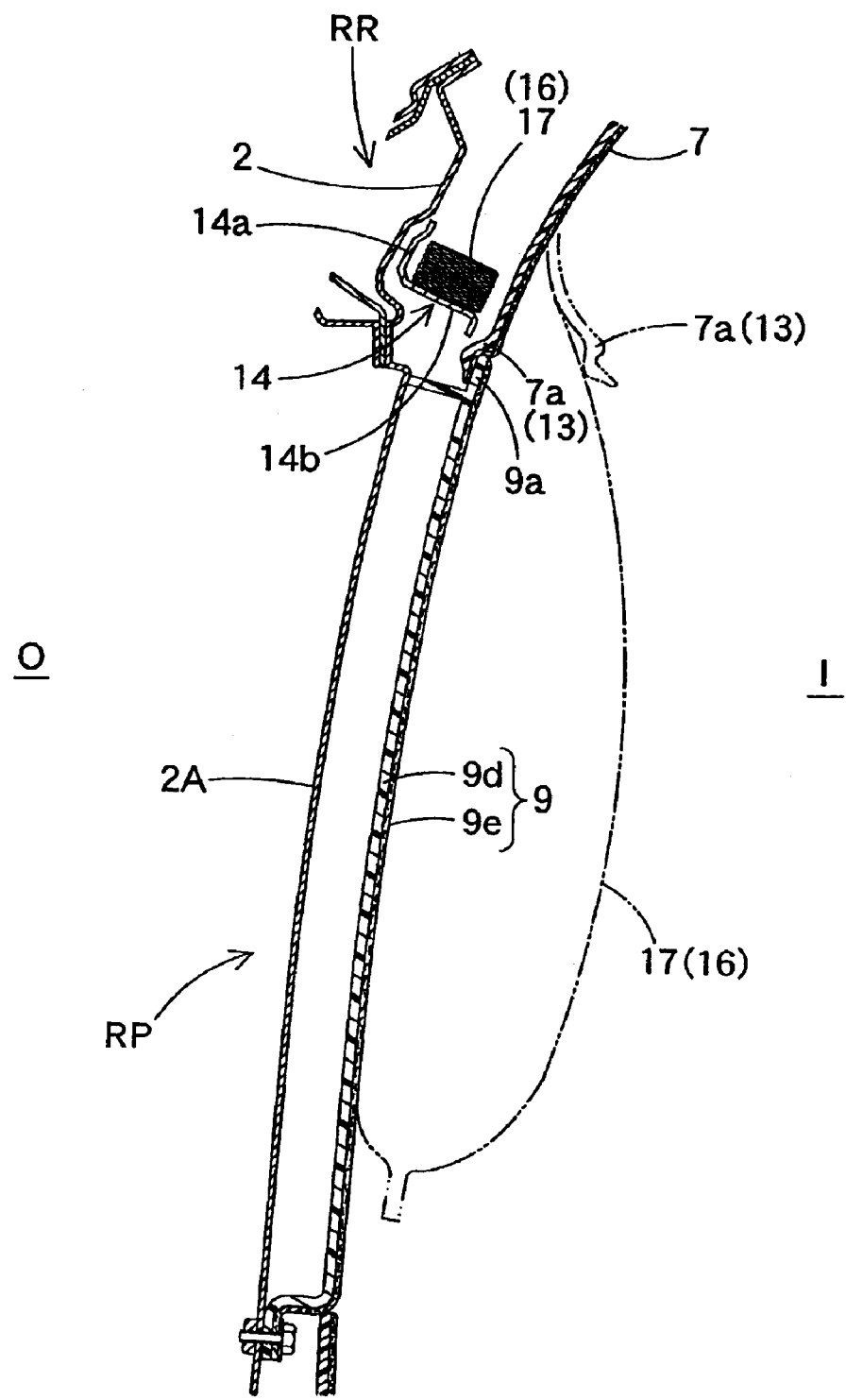
FIG. 2 is an enlarged schematic section of the portion along the line II—II of FIG. 1.
Figure 4:
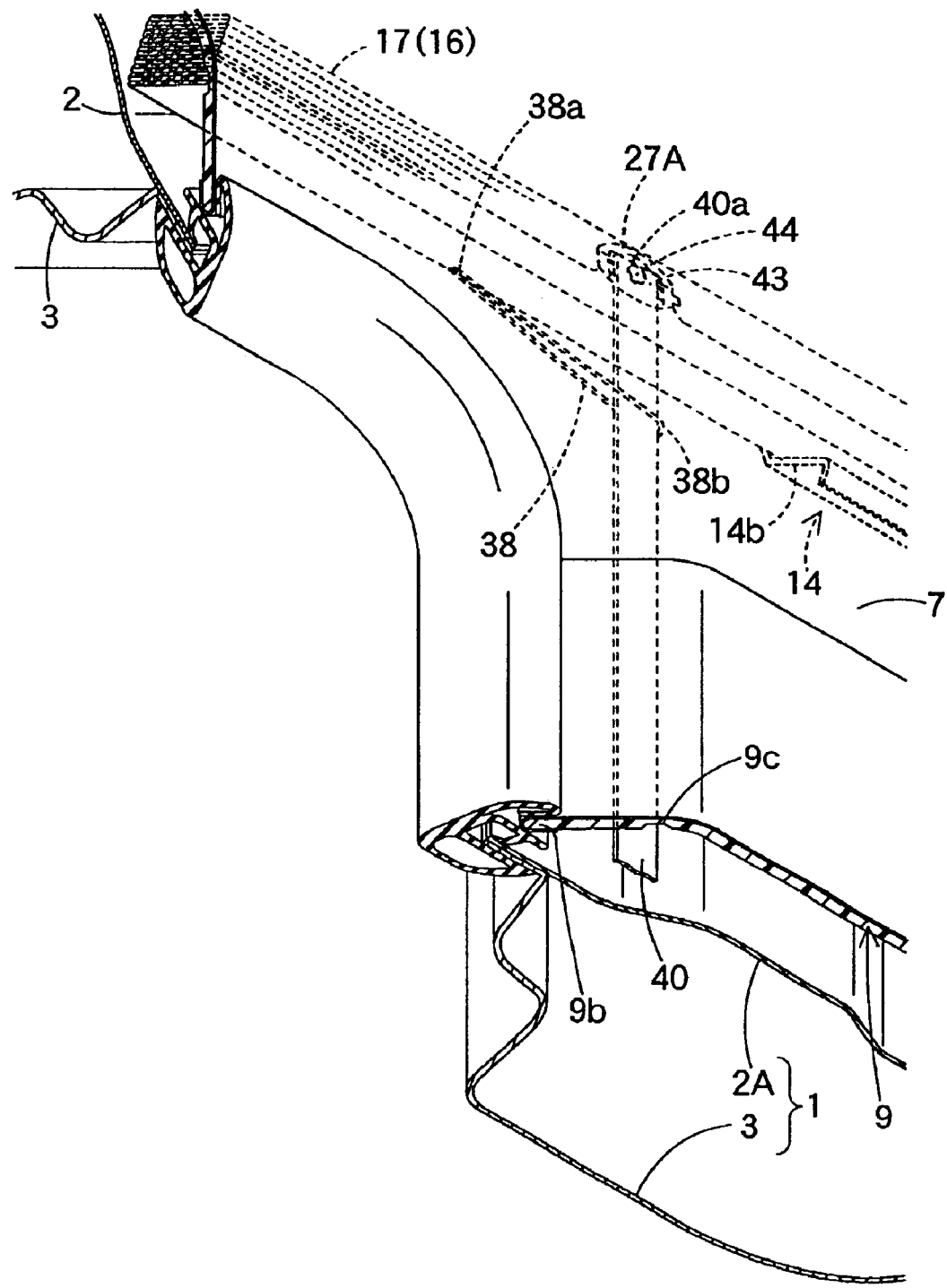
FIG. 4 is a schematic perspective view showing the vicinity of the upper end of a rear pillar portion in the same embodiment.

On the vehicular exterior side O of the roof head lining 7 over the rear pillar portion RP, on the other hand, there is arranged a regulating member 14 (FIGS. 2 and 4). This regulating member 14 regulates the protrusion of the airbag 16 toward the vehicular interior side I. The regulating member 14 is arranged on the vehicular exterior side O of the roof head lining 7 and over the upper end 9a of the rear pillar garnish 9 on the vehicular interior side I. Moreover, the regulating member 14 is formed to have a generally L-shaped cross section and is fixed at a not-shown portion on the inner panel 2A. The regulating member 14 is composed of a vertical wall portion 14a arranged on the exterior side O of the airbag 16, and a horizontal wall portion 14b arranged at the base of the airbag 16. The horizontal wall portion 14b is inclined down toward the vehicular interior side I. This inclination enables the airbag 16 to protrude, when expanded and inflated, toward the vehicular interior side I without the interference of the upper end 9a of the rear pillar garnish 9. Moreover, the regulating member 14 is arranged to the vehicular rear side of the guide member 40, as shown in FIG. 4.

The airbag 16 is folded and housed above the windows SW (SW1 and SW2) on the vehicular interior side, as shown in FIG. 1. As shown in FIGS. 1 and 5 to 7, the airbag 16 is provided with an airbag body 17, an inner tube 33 arranged in the airbag body 17, and a loop portion 38 arranged on the lower edge 17b of the airbag body 17 and acting as a connection member. The airbag body 17 can cover the vehicular interior sides of the windows SW1 and SW2 and the center pillar portion CP and the rear pillar portion RP adjacent to the windows SW1 and SW2. The inner tube 33 regulates the flow direction of the inflating gas into the airbag body 17. The loop portion 38 is connected to the guide member 40.

The airbag body 17 is hollow-woven of polyamide yarns or polyester yarns excepting an extension portion 31, as will be described hereinafter. Moreover, the airbag body 17 is composed of a gas inlet portion 18 to be inflated by admitting inflating gas G from the inflator 46, and a non-inlet portion 26 preventing the inflating gas G to flow in. When gas passes through the gas inlet portion 18, the interior side wall portion 18a and the exterior side wall portion 18b separate. Here, the extension portion 31 is sewn to the front edge of the peripheral edge joint portion 28, as will be described hereinafter.

The gas inlet portion 18 is composed, in the embodiment, of a front seat inlet portion 21, a rear seat inlet portion 22, and an inlet inflation portion 19. This inlet inflation portion 19 guides the inflating gas G discharged from the inflator 46 into the front and rear seat inlet portions 21 and 22. The front seat inlet portion 21 covers the vehicular interior side of the window SW1 on the front seat side when expanded. The rear seat inlet portion 22 covers the vehicular interior side of the window SW2 on the rear seat side. These individual front and rear seat inlet portions 21 and 22 are divided by section joint portions 29, as will be described hereinafter. Specifically, the individual front and rear seat inlet portions 21 and 22 have a plurality of vertical expansion portions 24, which are inflated in vertical rod shapes by admitting the inflating gas G.

The inlet inflation portion 19 is located close to the upper edge 17a of the airbag body 17 and is arranged to extend in the longitudinal direction. The inlet inflation portion 19 is made to communicate with the upper end of each vertical expansion portion 24 in the front and rear seat inlet portions 21 and 22. Also, the inlet inflation portion 19 is provided with an inlet port 19a, which is connected with the inflator 46. The inlet port 19a protrudes vertically upward generally in a cylindrical shape over the vertical expansion portions 24 arranged to the vehicular rear end of the front seat inlet portion 21.

The non-inlet portion 26 is so constructed as to join the interior side wall portion 18a and the exterior side wall portion 18b. The non-inlet portion 26 is provided with mounting portions 27, the peripheral edge joint portion 28, the section joint portions 29, a plate portion 30 and the extension portion 31.

The peripheral edge joint portion 28 is arranged around the gas inlet portion 18, at all portions contacting with the gas inlet portion 18 including the periphery of the plate portion 30 and is densely woven so as to allow no gas leakage. The mounting portions 27 are arranged in plurality to protrude upward from the peripheral edge joint portion 28 at the upper edge 17a of the airbag body 17. On each mounting portion 27, there is fixed a mounting bracket 43 for mounting the mounting portion 27 on the inner panel 2. In each mounting portion 27, moreover, there is formed a mounting hole 27a for inserting a mounting bolt 44. Each mounting portion 27 is fixed together with the mounting bracket 43 on the inner panel 2 within the body 1 by means of the mounting bolt 44.

The section joint portions 29 are so arranged in plurality within the regions of the front and rear seat inlet portions 21 and 22 as to extend upward from the lower edge of the peripheral edge joint portion 28 to the inlet inflation portion 19. The section joint portions 29 are arranged to define the front and rear seat inlet portions 21 and 22 into a plurality of vertical expansion portions 24, thereby to substantially equalize the thickness.

The plate portion 30 and the extension portion 31 are arranged to retain the entire shape of the airbag body 17 and to reduce the volume of the gas inlet portion 18 thereby to shorten the time period required for complete expansion. The plate portion 30 is formed into a generally rectangular shape. The plate portion 30 is arranged below the inlet inflation portion 19 between the front seat inlet portion 21 and the rear seat inlet portion 22. Moreover, the peripheral edge joint portion 28 is also arranged around the plate portion 30 and between this plate portion 30 and the gas inlet portion 18 (including the front and rear seat inlet portions 21 and 22 and the inlet inflation portion 19).

The extension portion 31 is formed into a generally triangular plate shape extending forward from the front end side of the front seat inlet portion 21. Moreover, the extension portion 31 is mounted and fixed at its leading end 31a on the inner panel 2 of the lower portion side of the front pillar portion FP on the side of the body 1. This extension portion 31 is provided at its leading end 31a with a mounting hole 31b for inserting the mounting bolt 44. Further, the leading end 31a is fixed on the inner panel 2 of the lower portion of the front pillar portion FP by fixing the mounting bracket 43 and by using the mounting bolt 44. Here in the embodiment, the extension portion 31 is formed separately from the airbag body 17 of a woven fabric of polyamide yarns or polyester yarns, and is sewn to the front end side of the peripheral edge joint portion 28. It is however natural that the extension portion 31 may be hollow-woven integrally with the airbag body 17.

Figure 6:
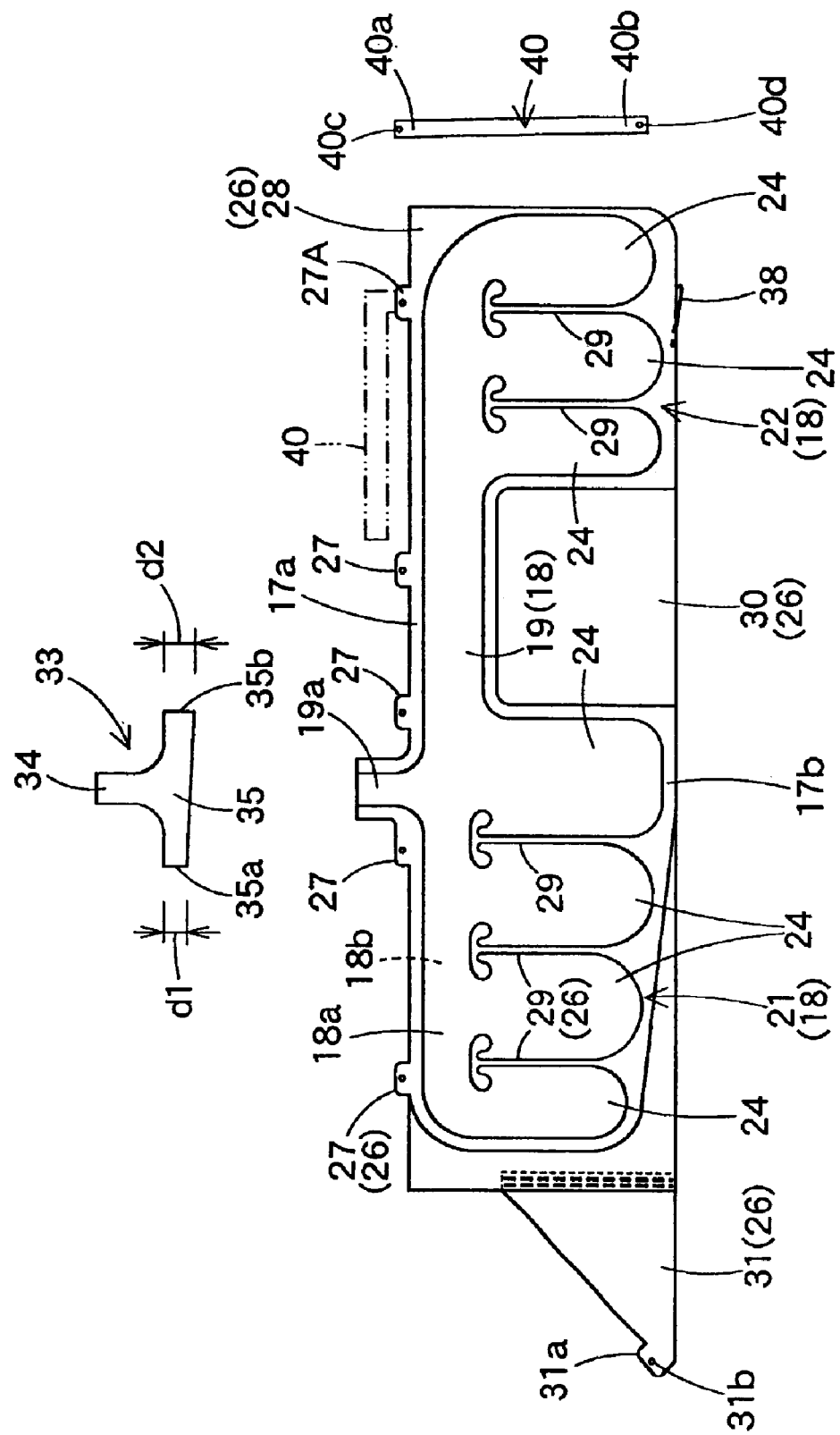
FIG. 6 is a front elevation showing the airbag and a guide member to be used in the same embodiment.

The inner tube 33 is arranged in the inlet inflation portion 19 and distributes the inflating gas G discharged from the inflator 46 to the front seat inlet portion 21 and the rear seat inlet portion 22. The inner tube 33 is formed of a woven fabric of polyamide yarns or polyester yarns. The inner tube 33 is provided with a generally cylindrical mounting portion 34 arranged in the inlet port 19a, and a body portion 35. The mounting portion 34 is mounted together with the inlet port 19a on the inflator 46. The body portion 35 is arranged to communicate with the mounting portion 34 and to intersect with the mounting portion generally at a right angle. This body portion 35 is formed to have two open ends. Moreover, the body portion 35 is so formed that the opening portion 35a on the front side has an internal diameter d1 smaller than the internal diameter d2 of an opening portion 35b on the rear side, as shown in FIG. 6. In short, the body portion 35 is so constructed that the inflating gas G discharged from the inflator 46 may easily flow to the rear seat inlet portion 22, in which the loop portion 38 (as the connection member) and the guide member 40 are arranged.

Figure 5:
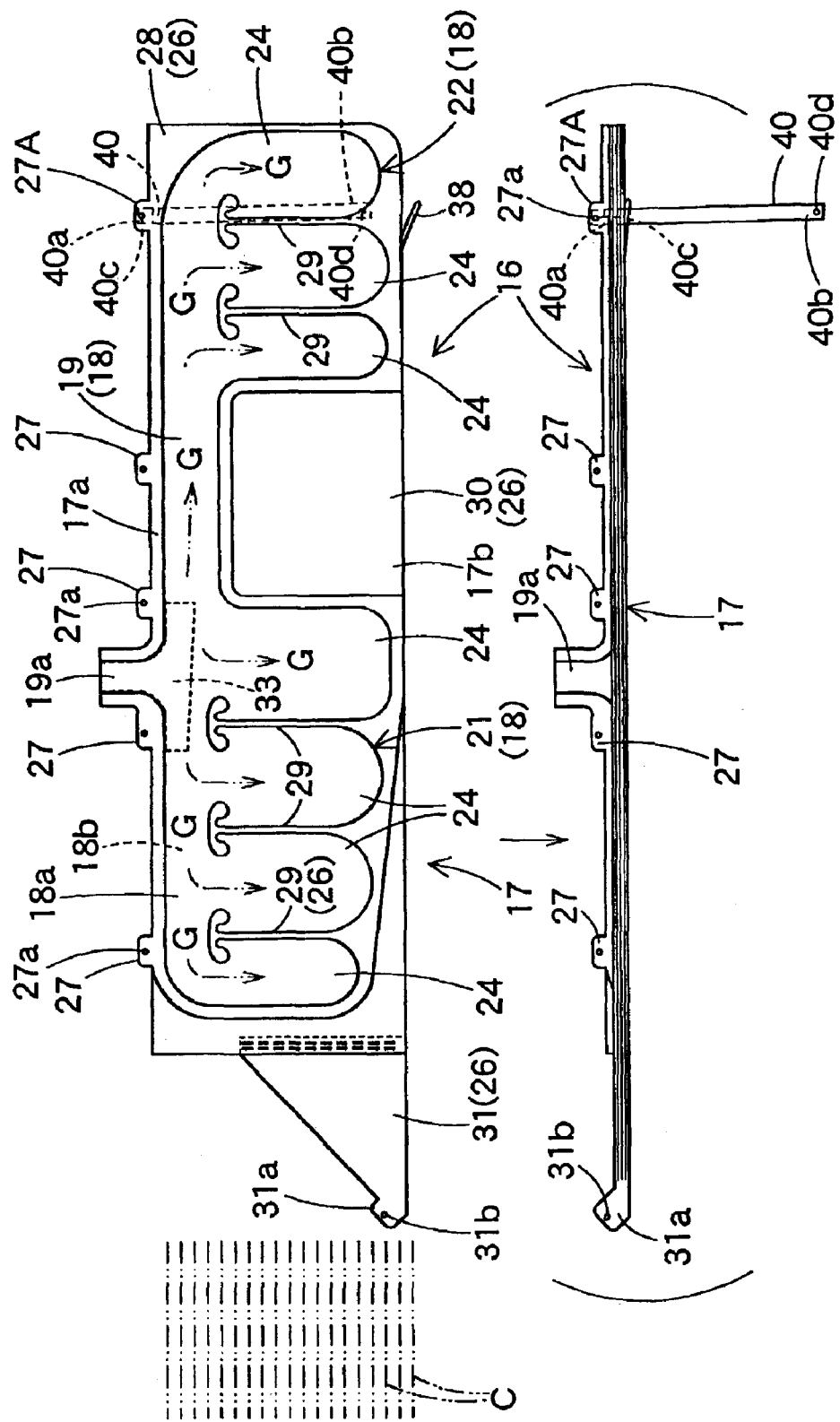
FIG. 5 is a front elevation showing the state in which an airbag to be used in the same embodiment is expanded flat.

The loop portion 38 acting as the connection member to be slidably connected to the guide member 40 is arranged on the lower edge 17b of the airbag body 17, as shown in FIGS. 5 and 6. The loop portion 38 is formed separately from the airbag body 17. In the case of the embodiment, the loop portion 38 is formed into a loop in which the guide member 40 can be inserted, by sewing the two ends of a string of polyamide yarns or polyester yarns to the airbag body 17. Further, the loop portion 38 is arranged at the portion of the airbag body 17 to the front of the guide member 40, the opposite side of the regulating member 14, as shown in FIGS. 1 and 4. Moreover, the front end 38a of the loop 38, where the loop is connected to the airbag body 17, is separated from the front edge 9b of the rear pillar garnish 9 toward the center of the window SW2, as shown in FIGS. 1 and 4. When the airbag 16 is expanded, moreover, the loop portion 38 is slid downward along the guide member 40 while pushing and opening the front edge 9b of the rear pillar garnish 9 toward the vehicular interior side I as the lower edge 17b of the airbag 16 moves downward.

The guide member 40 is formed of a woven fabric of polyamide yarns or polyester yarns and is formed into a vertically extending band shape. In the case of the embodiment, the guide member 40 is integrated with the airbag body 17 by having its upper end 40a sewn to the peripheral edge joint portion 28 in the airbag body 17. As shown in FIGS. 1 and 4, the guide member 40 is arranged in the vertical direction near the front edge of the inner panel 2A constructing the rear pillar portion RP. Moreover, the guide member 40 is covered on the vehicular interior side I with the front edge 9b of the rear pillar garnish 9. As shown in FIG. 1, this guide member 40 is arranged from the portion of the roof side rail portion RR over the rear pillar portion RP to the portion of the rear pillar portion RP over the lower edge 17b of the airbag 16 when it has completed its inflation. The guide member 40 is fixed at its upper end 40a and lower end 40b on the inner panels 2 and 2A. When the airbag 16 is expanded, moreover, the guide member 40 allows the loop portion 38 to slide downward between the upper end 40a and the lower end 40b. The upper end 40a of the guide member 40 is provided with a mounting hole 40c. Specifically, the upper end 40a of the guide member 40 is fastened together with the mounting portion 27A of the airbag body 17 on the inner panel 2 by means of the mounting bracket 43 and the mounting bolt 44. The lower end 40b of the guide member 40 is provided with a mounting hole 40d. This lower end 40b of the guide member 40 is mounted and fixed on the inner panel 2A which is over the lower edge 17b of the airbag 16 when it has completed its inflation, by means of the not-shown bracket and a bolt 45. When the airbag 16 completed its inflation, moreover, the rear end 38b of the loop portion 38, where the loop portion 38 contacts with the guide member 40, is located near the lower end 40b of the guide member 40. In the embodiment, moreover, the lower end 40b of the guide member 40 is set at such a position as to establish a tension on the lower edge 17b of the airbag 16 in the longitudinal direction of the vehicle through contact with the loop portion 38 when the airbag 16 has completed its inflation.

Figure 3:
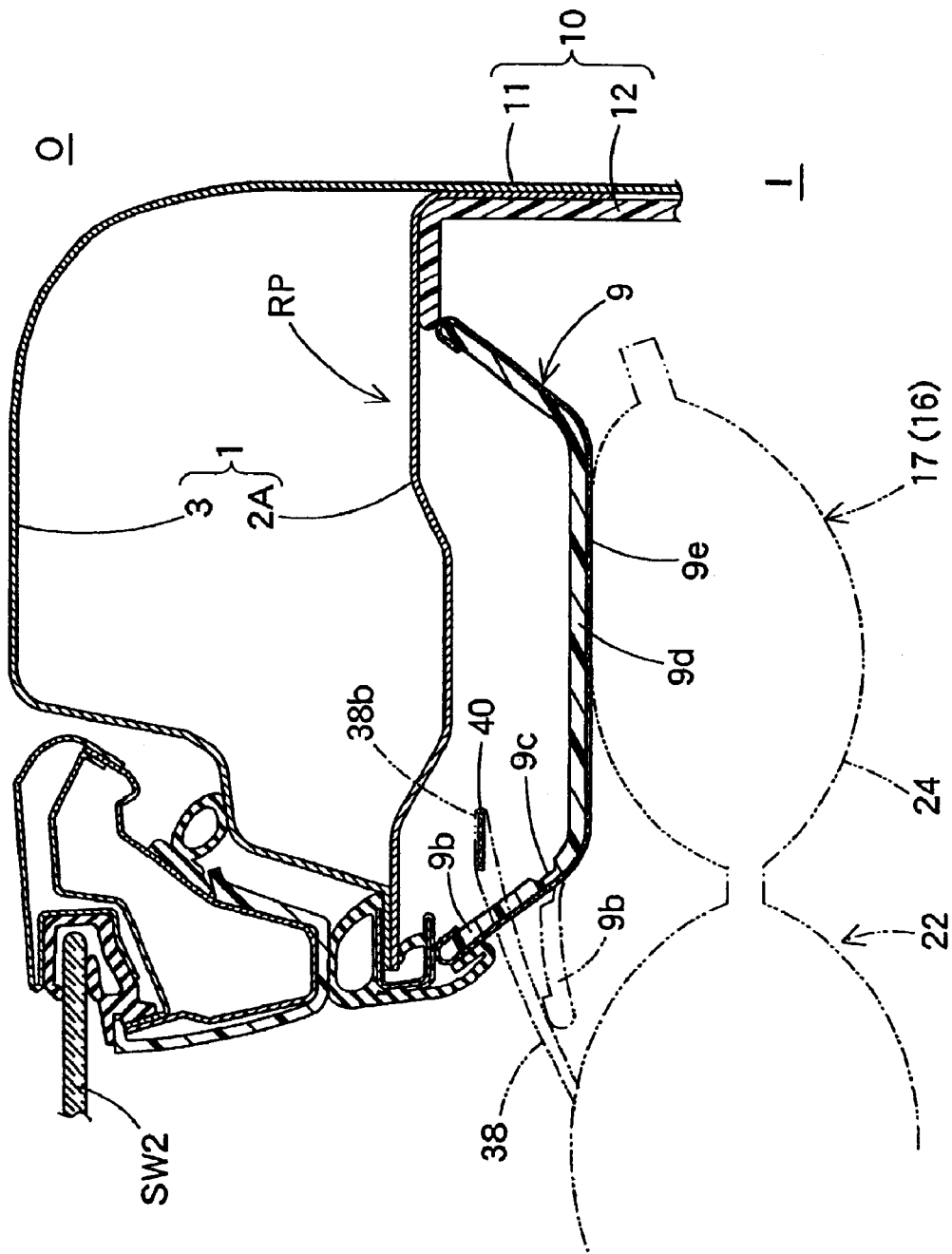
FIG. 3 is an enlarged schematic section of the portion along the line III—III of FIG. 1.

As shown in FIG. 3, on the other hand, a hinge portion 9c is formed on the rear side of the front edge 9a of the rear pillar garnish 9. This hinge portion 9c is so arranged that the front edge 9a of the rear pillar garnish 9 may be easily pushed and opened by the loop portion 38 when the airbag 16 is expanded and inflated. In the embodiment, moreover, the rear pillar garnish 9 is provided with a base portion 9d of a synthetic resin and a facing 9e of a decorating cloth or the like covering the vehicular interior side surface of the base portion 9d (as referred to FIGS. 3 and 4).

The inflator 46 has a generally cylindrical shape, as shown in FIG. 1. On this inflator 46, the inlet port 19a of the inlet inflation portion 19 of the airbag body 17 is mounted, and the inflator 46 is connected to the airbag body 17 by means of a clamp 49. Further, the inflator 46 is mounted and fixed on the inner panel 2 of the portion of the roof side rail portion RR over the center pillar portion CP, within the body 1 by means of a mounting bracket 47 and mounting bolts 48. Moreover, the inflator 46 is covered on its vehicular interior side with the lower edge 7a of the roof head lining 7.

Here will be described how to mount the head protecting airbag device M of this embodiment on the vehicle V. First of all, the airbag 16 is manufactured by sewing the loop portion 38 and the guide member 40 to the airbag body 17, into which the inner tube 33 has been inserted in advance. Then, the airbag body 17 is folded from its flatly expanded state to a bellows shape with a number of creases C (as referred to double-dotted lines of FIG. 5) in the longitudinal direction so that the lower edge 17b of the airbag body 17 approaches the upper edge 17a except for the gas inlet port 18. At this time, the guide member 40 is inserted into the loop portion 38. Further, the airbag 16 after being folded is suitably wrapped at predetermined portions with not-shown breakable wrapping members for preventing the airbag 16 from collapsing.

After this, the mounting brackets 43 are fixed to each mounting portion 27 and the leading end 31a of the extension portion 31. Then, the inflator 46 is connected to the inlet port 19a by means of the clamp 49. After this, the airbag assembly is formed by attaching the mounting brackets 47 to the inflator 46 and by assembling the inflator 46 on the airbag 16.

Then, the individual mounting portions 27, the leading end 31a of the extension portion 31, and the inflator 46 are mounted and fixed on the inner panel 2 by means of the mounting bolts 44 and 48. The lower end 40b of the guide member 40 is mounted and fixed at the predetermined portion of the inner panel 2A by means of the bolt 45. As a result, the airbag assembly can be mounted on the body 1 of the vehicle V.

Next, the not-shown lead wire extending from the inflator 46 is connected to a predetermined airbag activating circuit. In the front pillar portion FP, the front pillar garnish 6 is mounted and fixed on the inner panel 2. In the roof side rail portion RR, the roof head lining 7 is mounted and fixed on the inner panel 2. Moreover, the garnishes 8 and 9 of the center pillar portion CP and the rear pillar portion RP are mounted and fixed on the inner panels 2 and 2A of the body 1. As a result, the airbag device M can be mounted on the vehicle V.

If the inflator 46 is activated, the inflating gas G flows from the inlet port 19a into the inlet inflation portion 19 thereby to break the not-shown wrapping member. Then, the inflating gas G flows into the front and rear seat inlet portions 21 and 22 and pushes and opens the lower edges 6a and 7a of the front pillar garnish 6 and the roof head lining 7 acting as the airbag cover 13. As a result, the airbag 16 is expanded and inflated to cover the vehicular interior sides of the windows SW1 and SW2, the center pillar portion CP and the rear pillar portion RP, as shown by the double-dotted lines of FIG. 1 and in FIG. 7.

At this time, in the head protecting airbag device M of the embodiment, when the airbag 16 is expanded, the loop portion 38 (as the connection member) is guided downward by the guide member 40 and while sliding it pushes and opens the vertical front edge 9b of the rear pillar garnish 9, toward the vehicular interior side I. In the head protecting airbag device M of the embodiment, more specifically, when the airbag 16 is expanded, the pillar garnish need not be broken at a predetermined position to open at the desired position as the case in the related art. In the head protecting airbag device M of the embodiment, the front edge 9b of the pillar garnish 9 is merely pushed and opened toward the vehicular interior side I thereby allowing the loop portion 38 to slide downward along the guide member 40 through the clearance between that edge portion 9b and the inner panel 2A. Therefore, the loop portion 38 can smoothly slide downward. In the head protecting airbag device M of the embodiment, moreover, the front end 38a of the loop 38 is connected to the airbag body 17 apart from the front edge 9b of the rear pillar garnish 9 toward the center of the window SW2. Therefore, the airbag 16 itself can be expanded smoothly along the guide member 40 without interfering with the front edge 9b of the rear pillar garnish 9 so as to cover the vehicular interior side I of the pillar garnish 9.

In the head protecting airbag device M of the embodiment, therefore, even if the airbag 16 is constructed to cover the vehicular interior side I of the pillar garnish 9 on the pillar portion RP at the completion of inflation, the airbag 16 can be smoothly expanded along the guide member 40 covered by the pillar garnish 9.

Moreover, the head protecting airbag device M of the embodiment is so constructed that the front edge 9b of the rear pillar garnish 9 is opened toward the vehicular interior side thereby allow the loop portion 38 (as the connection member) to slide downward. In order to slide the loop portion 38, therefore, a breakaway portion or the like forming the opening when broken need not be arranged in the pillar garnish 9. Alternatively, the pillar garnish 9 may be provided on its vehicular interior side surface with the facing 9e, which is made of such a decorating cloth or the like as to give resistance when broken. As a result, it is possible to improve the design of the vehicular interior side of the pillar garnish 9.

In the head protecting airbag device M of the embodiment, moreover, the airbag 16 can be expanded and inflated smoothly without interference at the upper end 9a of the pillar garnish 9 by the regulating member 14. And, the loop portion 38 is arranged at a position opposite the regulating member 14 across the guide member 40. Even if the portion of the airbag 16 positioned in the regulating member 14 protrudes at the beginning of the expansion and inflation toward the vehicular interior side, therefore, the loop portion 38 is so little affected by the protrusion toward the vehicular interior side that it can slide downward along the guide member 40 while suppressing interference with the pillar garnish upper end 9a. As a result, movement of the airbag 16 itself and the loop portion 38 does not meet interference at the upper end 9a of the pillar garnish 9 so that the airbag 16 can be expanded more smoothly along the guide member 40.

In the head protecting airbag device M of the embodiment, moreover, at the completion of the inflation of the airbag 16, the rear end 38b of the loop portion 38 contacting the guide member 40 is arranged at such a position as to establish a tension in the longitudinal direction of the vehicle at the lower edge 17b of the airbag 16 which has completed its inflation. At the completion of the inflation of the airbag 16, therefore, a high tension in the longitudinal direction is established on the side of the lower edge 17b of the airbag 16 by the loop portion 38. As a result, even in case the head of a passenger pushes the airbag 16 toward the vehicular exterior side, the airbag 16 having an excellent cushioning property can protect the passenger head properly without being seriously shaken by the pushing force of the head.

Figure 8:
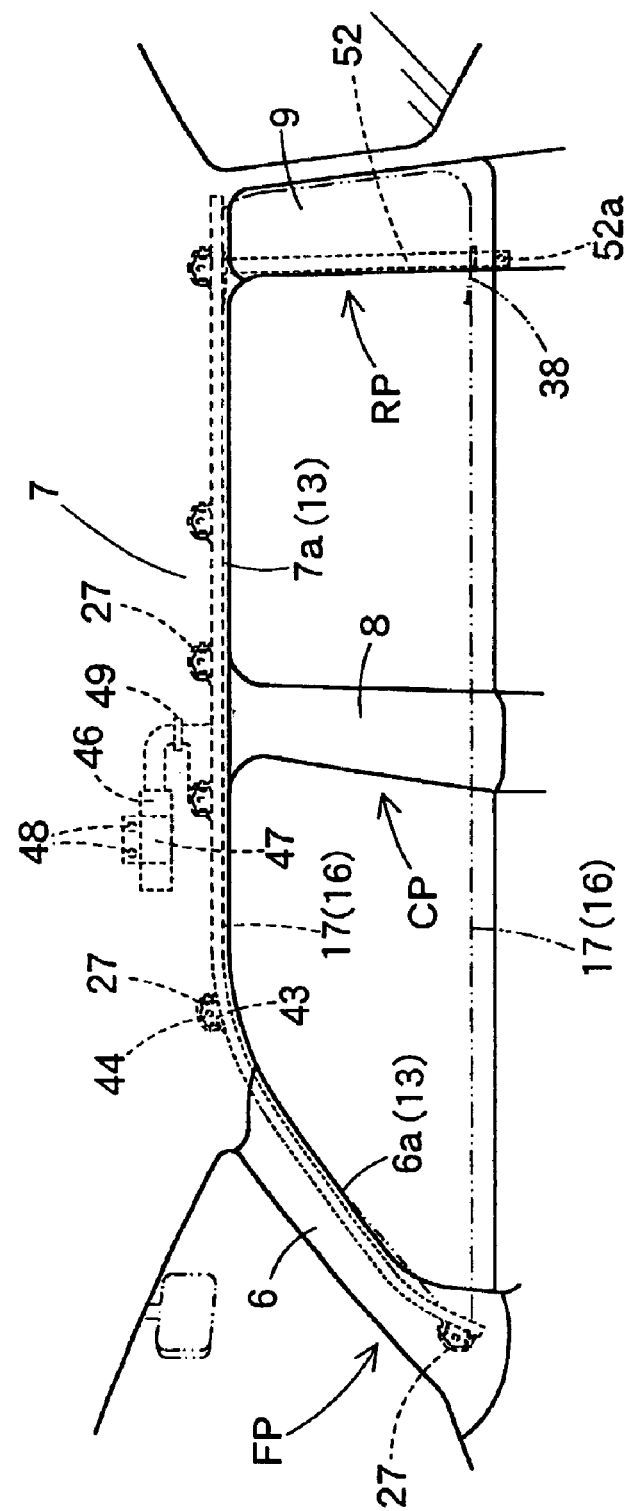
FIG. 8 is a schematic front elevation showing the activated state of a head protecting airbag device in which a guide member of another embodiment is arranged, as viewed from the interior of a vehicle.

If the aforementioned point is not considered, it is natural that a guide member 52 may be constructed to have its lower end 52a below the lower edge 17b of the airbag 16 that has completed its inflation, as shown in FIG. 8.

In the embodiment, moreover, the guide member 40 is formed of a band-shaped woven fabric. Specifically, the guide member 40 can be formed of the fabric material which is left after the airbag body 17 is cut out. Therefore, it is possible to suppress the cost for manufacturing the airbag device M. Of course, the guide member 40 may be formed of not only the woven fabric but also either a wire made of a flexible material or a rod material made of a rigid metal.

In the embodiment, moreover, the guide member 40 is fixed on the side of its upper end 40a on the inner panel 2 within the body 1 together with the mounting portion 27A of the airbag body 17. Therefore, the upper end 40a of the guide member 40 need not be separately fixed on the inner panel 2 so that the number of steps at the time of mounting the airbag device M on the vehicle V can be reduced.

In the embodiment, moreover, the guide member 40 formed of the woven fabric is sewn to the airbag body 17. As shown by double-dotted lines in FIG. 6, however, the guide member 40 may be hollow-woven integrally with the airbag body 17 by connecting its upper end to the upper edge 17a of the airbag body 17. In case the airbag is thus constructed, the guide member and the airbag body can be integrally formed so that the number of steps of and the cost for manufacturing the airbag can be reduced. Also, the upper end of the guide member is not separately fixed on the inner panel so that the number of steps required for mounting the airbag device on the vehicle can also be reduced.

In the embodiment, moreover, the guide member 40 is arranged on the front edge of the rear pillar portion RP, the edge on the side of the window SW2. Even if the airbag body 17 is tensed on its lower edge side toward the window SW2, therefore, the loop portion 38 can slide smoothly downward along the guide member 40. This is because the guide member 40 meets with no interference from the opened front edge 9b of the pillar garnish 9. As a result, the airbag body 17 can be smoothly expanded and inflated. In the case of the embodiment, moreover, the airbag device M is mounted on the double-cab vehicle which is provided at the rear of the window SW2 with a rear wall portion 10 arranged to intersect with the window SW2 at a right angle. However, the guide member 40 is arranged on the front edge of the rear pillar portion RP so that the loop portion 38 is removed from the rear wall portion 10.

If the aforementioned point is not considered, it is natural that the guide member 40 may be arranged on the rear edge of the rear pillar portion RP and that the loop portion 38 may be arranged to be removed from the rear side of the guide member 40. Moreover, the guide member 40 may also be arranged on the front edge side or the rear edge side of the center pillar portion CP.

In the embodiment, moreover, the airbag device M is mounted on the double-cab vehicle V, but the application of the airbag device of the invention should not be limited to the double-cab vehicle V. Specifically, the airbag device of the invention may be mounted on a vehicle such as a single-cab vehicle or a sedan type vehicle.

What is claimed is:

1. A head protecting airbag device comprising:

an airbag folded and housed above the upper edge of a window on the interior side of a vehicle and extending above a pillar portion adjacent to said window, wherein said airbag is constructed to expand downward when it admits inflating gas, thereby to cover the vehicular interior sides of said window and a pillar garnish of a synthetic resin arranged on the vehicular interior side of an inner panel of said pillar portion, wherein a guide member is vertically arranged near one longitudinal edge of said inner panel so that its vehicular interior side is covered by the edge portion of said pillar garnish, wherein a flexible connection member slidably connected to said guide member is connected to said airbag, wherein said connection member is connected to said airbag at a portion to the front or the rear of the front or rear edge portion of said pillar garnish toward the center of said window, and wherein said connection member can push and open an edge portion of said pillar garnish toward the vehicular interior side as it slides downward along said guide member when said airbag expands and inflates.

2. A head protecting airbag device according to claim 1, wherein a regulating member is arranged over the vehicular exterior side of said pillar garnish, thereby to regulate the protruding direction of said airbag housed over said pillar garnish toward the vehicular interior side, wherein said guide member is arranged to the front or the rear of said regulating member, and wherein said connection member is arranged on the side of the guide member opposite from said regulating member.

3. A head protecting airbag device according to claim 1, wherein said connection member is connected to said airbag near the lower edge of said airbag, and wherein said connection member contacts said guide member when said airbag completes its inflation at a position which allows tension to be generated in the lower edge of said airbag in the longitudinal direction of the vehicle.

4. A head protecting airbag device according to claim 1, wherein said guide member is made of a band-shaped woven fabric.

5. A head protecting airbag device according to claim 4, wherein said guide member is fixed on the body of said vehicle at its upper end together with the upper edge of said airbag which has been folded and housed.

6. A head protecting airbag device according to claim 4, wherein said guide member is formed integrally with said airbag so that the upper end of the guide member is connected to the upper edge of said airbag.

7. A head protecting airbag device according to claim 1, wherein said guide member is arranged near the edge facing said window of the inner panel of said pillar portion.

* * * * *